(12) United States Patent  
Park et al.

(10) Patent No.: US 6,468,664 B1
(45) Date of Patent: Oct. 22, 2002

(54) POLY(IMIDE-SILOXANE) COMPOUND FOR TAPELESS LOC PACKAGING

(75) Inventors: Chan Eon Park, Pohang-shi; Jin Ho Kang, Seoul; Sang Min Song, Yongin-shi; Young Tak Ahn, Seoul; Jae Geun Park; Myung Sup Jung, both of Daejun-shi, all of (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/690,748

(22) Filed: Oct. 18, 2000

(30) Foreign Application Priority Data

Oct. 19, 1999 (KR) .............................................. 99-45272

(51) Int. Cl.$^7$ ............................ B32B 9/04; H01L 21/50; C08L 79/08; C08L 83/04

(52) U.S. Cl. .................... 428/447; 428/428; 428/473.5; 525/422; 525/431; 525/432; 525/435; 525/436; 525/446; 438/106

(58) Field of Search ................................ 428/447, 448, 428/473.5; 525/422, 431, 432, 435, 436, 446; 438/106

(56) References Cited

U.S. PATENT DOCUMENTS

| | | | |
|---|---|---|---|
| 4,389,504 A | | 6/1983 | St. Clair et al. ............. 524/233 |
| 5,677,393 A | * | 10/1997 | Ohmori et al. .............. 525/423 |
| 5,739,263 A | | 4/1998 | Yoshida et al. .............. 528/353 |
| 5,773,509 A | * | 6/1998 | Yoshida et al. .............. 524/600 |
| 5,935,372 A | * | 8/1999 | Rojstaczer et al. .......... 156/329 |
| 5,942,592 A | | 8/1999 | Zhao et al. .................... 528/26 |
| 6,007,920 A | * | 12/1999 | Umehara et al. ......... 428/473.5 |
| 6,045,886 A | * | 4/2000 | Oka et al. .................... 428/41.5 |
| 6,117,510 A | * | 9/2000 | Ishikawa et al. ........... 428/41.7 |
| 6,268,033 B1 | * | 7/2001 | Oka et al. .................... 428/40.1 |

FOREIGN PATENT DOCUMENTS

| | | |
|---|---|---|
| JP | 58-157190 | 9/1983 |
| JP | 62-235382 | 10/1987 |
| JP | 62-235383 | 10/1987 |
| JP | 1-282283 | 11/1989 |
| JP | 2-15663 | 1/1991 |

\* cited by examiner

*Primary Examiner*—Robert Dawson
*Assistant Examiner*—Michael J. Feely
(74) *Attorney, Agent, or Firm*—Lee & Sterba, P.C.

(57) ABSTRACT

The present invention relates to a poly(imide-siloxane) compound useful as passivation layer for packaging tapeless LOC, which is produced by reacting in a polar solvent a diaminosiloxane compound of the formula(1)

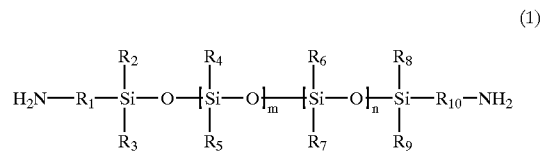

(1)

wherein $R_1$, $R_2$, $R_3$, $R_4$, $R_5$, $R_6$, $R_7$, $R_8$, $R_9$, and $R_{10}$ are independently an aromatic group, aliphatic group or halogenated hydrocarbon, hydroxy, or ether group, and m and n are integers such that m+n is an integer of 0~1000; and a diamine compound of the formula(2)

$$H_2N-R-NH_2 \qquad (2)$$

wherein R is at least one selected from the below groups:

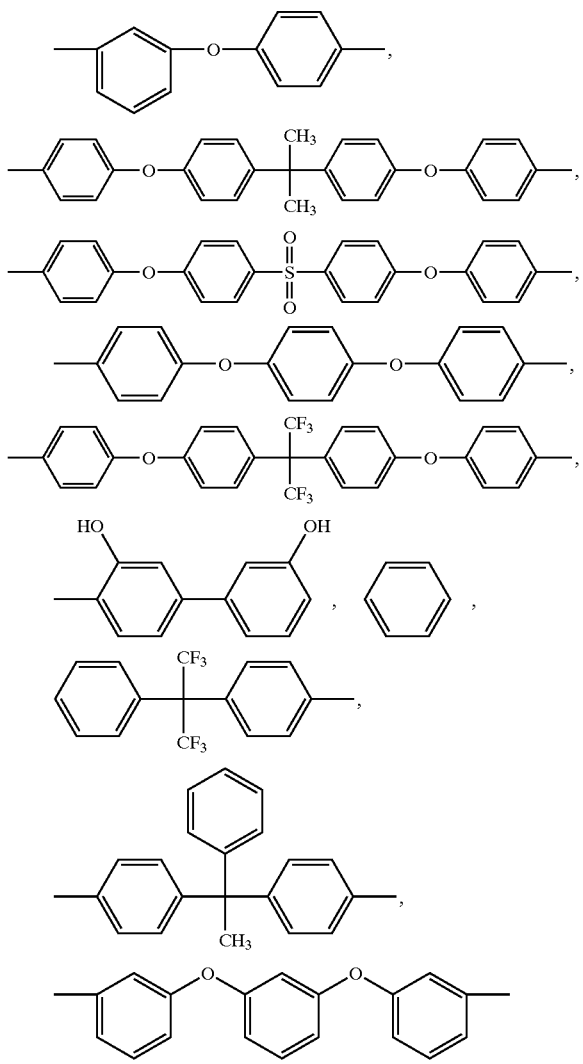
with an aromatic tetracarboxylic dianhydride of the formula (3)
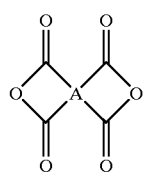
(3)
wherein A is at least one selected from the below groups:
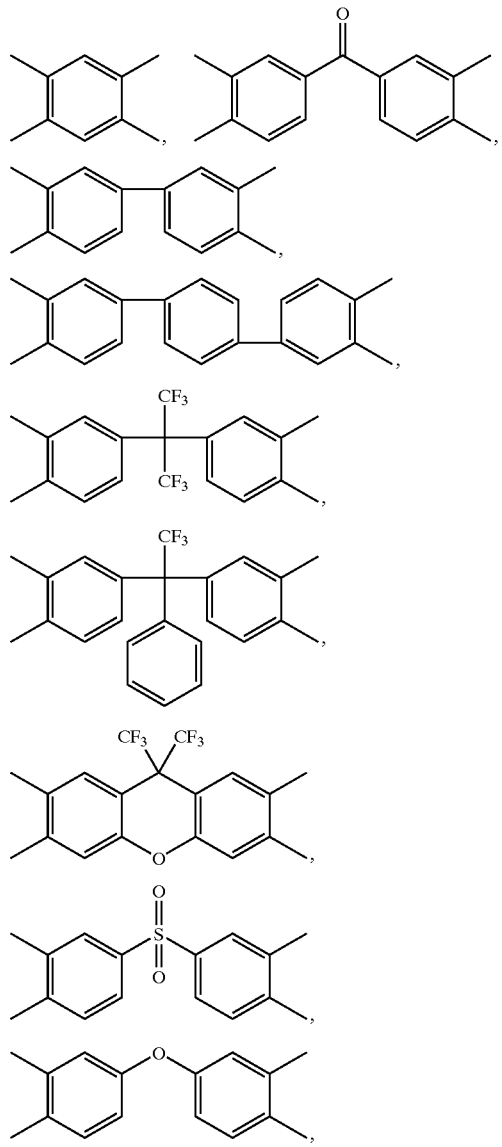
wherein the number of moles of the compound (3) is the same as the total number of moles of compounds (1) and (2).
13 Claims, 2 Drawing Sheets

POLY(IMIDE-SILOXANE) COMPOUND FOR TAPELESS LOC PACKAGING

FIELD OF THE INVENTION

The present invention relates to a poly(imide-siloxane) compound, more specifically to a poly(imide-siloxane) compound, which can be applied to a passivation layer without an adhesive agent or an adhesive tape for packaging LOC(lead-on-chip) and which has an excellent photoresist wetability and an excellent adhesion with both a silicon chip and a lead frame.

BACKGROUND OF THE INVENTION

Polyimide(PI) is widely used in semiconductor devices, since it is a polymer material having excellent thermal and mechanical properties such as glass transition temperature and heat resistance. The polyimide to be used for semiconductor buffer coating is applied to the top of a chip before covering an epoxy molding compound(EMC) on the chip. The polyimide applied to the top of the chip serves as a dielectric layer, a passivation layer, an alpha-ray shield layer and the like, and thus protect the chip from contaminants such as exterior moisture and metal ions, and thermal stress.

The recent multifunctional and high capacity trend in semiconductor chips has brought changes in chip packages, one of which is the lead-on-chip (LOC) structure. In this structure, a die pad-free lead frame and the chip are fixed with a double-coated adhesive tape. Accordingly, as the area of the silicon chip is larger than that of the conventional one even with same outer area as the conventional one, a chip package having high capacity can be produced. Further, as the length of wiring bonding is shortened and the transmission of the signal becomes fast, the heat generated by the consumption of high electric power is emitted, and the size of the device is reduced.

In the structure of the LOC-type package, the versatile adhesive interfaces between chip and polyimide, polyimide and EMC, polyimide and lead frame, lead frame and EMC and the like are formed, and the strong adhesive strength in these interfaces should be retained even in severe conditions such as high temperature and high humidity, in order to attain a reliable semiconductor chip.

In the past, silane coupling agents or siloxane-modified polyimides containing a 1,3-bis(3-aminopropyl) tetramethyldisiloxane were used for adhering the silicon chip with the polyimide passivation layer, and an adhesive tape was used for adhering a polyimide passivation layer with a lead frame. Examples of the adhesives include an adhesive having a high melting point consisting of a polyamide-imide or a polyamide disclosed in unexamined Japanese patent publication No. 282,283; a polyimide adhesive disclosed in unexamined Japanese patent publication No. 157,190; and a thermosetting polyimide adhesive film disclosed in unexamined Japanese patent publication Nos. 235,382; 235,383; and 15,663.

However, since the foregoing polyamide-imide or polyamide adhesive film have high water absorption due to hydrophilic amide group contained therein, the reliability is low when it is used as an electronic material. Polyimide cannot be used in electronic parts sensitive to heat, pressure, water, etc., because it has to be semi-cured at a high temperature of 275° C. and a high pressure of 50 kgf/cm$^2$ for a long time of 30 minutes in an adhering process. Furthermore, it produces water during the course of the curing process. U.S. Pat. No. 5,739,263 discloses the use of an adhesive tape introducing a siloxane to a polyimide. But, in the case of a long chain of siloxane modified polyimide, the tape is too opaque to be directly used as a passivation layer as well as to be applied to the process for manufacturing a semiconductor. Moreover, the photoresist cannot be coated, since the surface is too non-polar. U.S. Pat. Nos. 5,942,592; 5,739,263; and 4,389,504 disclose that since the polyimide is modified with a siloxane, i.e. polydimethyl siloxane having only one kind of molecular weight, it cannot have excellent thermal and mechanical properties.

Alternatively, a siloxane is introduced to increase adhesive strength. As the molecular weight of the siloxane is increased, the adhesive strength with the lead frame is also increased, but the adhesive strength with the silicon chip is reduced. In this case, an adequate distribution of the molecular weight having a high adhesive strength with both the silicon chip and the lead frame has to be determined.

Moreover, the more the molecular weight and the siloxane content are increased, the more the film is opaque due to phase-separation, and the more the surface of the film becomes non-polar, thus deteriorating the wetability of the photoresist. Accordingly, the lithography process cannot be carried out.

As a result of the present inventors' earnest studies for solving the above problems, they have found that a poly (imide-siloxane) compound for packaging LOC having excellent thermal and mechanical properties, and low moisture absorption, which can be applied to a LCC package without an adhesive or an adhesive tape, has an excellent adhesive strength with both silicon chip and lead frame, and has an excellent wetability of the photoresist.

SUMMARY OF THE INVENTION

A feature of the present invention is to provide a poly (imide-siloxane) compound for packaging LOC having a high adhesive strength with both silicon chip and lead frame by defining the distribution of the molecular weight of the siloxane.

Another feature of the present invention is to provide a poly(imide-siloxane) compound for packaging LOC, which has an excellent wetability of the photoresist and is capable of carrying out a lithography process by controlling the domain size of the phase-separated siloxane and changing the chemical structure of the siloxane.

Still another feature of the present invention is to provide a poly(imide-siloxane)compound for packaging LOC, which can be used as a passivation layer without silane coupling agents or adhesive tapes.

Still another feature of the present invention is to provide a poly(imide-siloxane)compound for packaging LOC, which is capable of reducing the cost for manufacturing the semiconductor by saving the cost of material and shortening the processes due to no additional use of coupling agents or adhesive tapes.

In accordance with one aspect of the present invention, there is provided a poly(imide-siloxane) compound for packaging LOC which is produced by reacting, in a polar solvent, a diaminosiloxane compound of the formula(1)

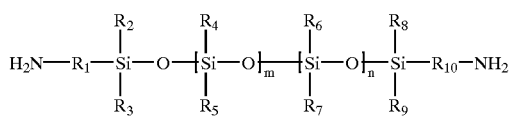  (1)

wherein $R_1$, $R_2$, $R_3$, $R_4$, $R_5$, $R_6$, $R_7$, $R_8$, $R_9$, and $R_{10}$ are independently an aromatic group, aliphatic group or halogenated hydrocarbon, hydroxy, or ether group, and the sum "m+n" is an integer of 0 to about 1000 (0~1000); and a diamine compound of the formula(2)

$$H_2N—R—NH_2 \quad (2)$$

wherein R is one of the following groups:

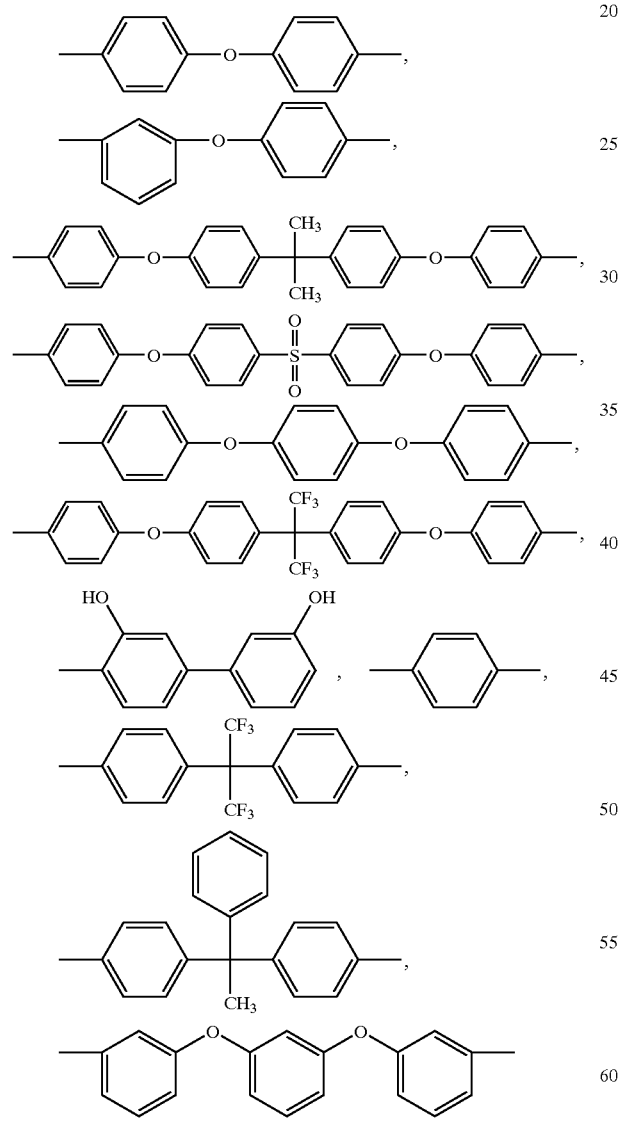

with an aromatic tetracarboxylic dianhydride of the following formula (3), with the number of moles of compound (3) being the same as the total number of moles of the compounds (1) and (2)

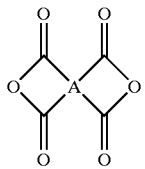  (3)

wherein A is one of the following groups:

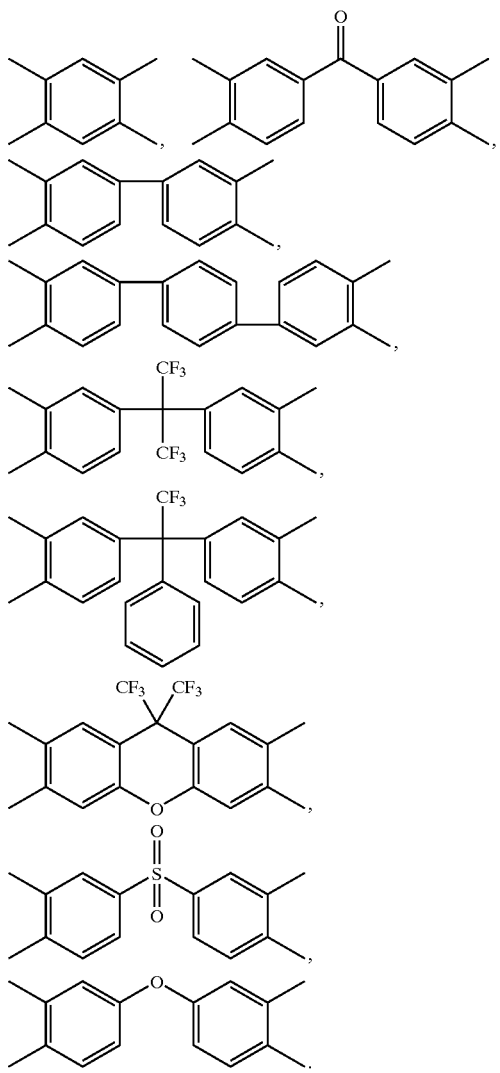

In accordance with another aspect of the present invention, there is provided a composition including a mixture of at least two compounds as described above. In a first compound of the mixture, m+n is 14 or less, while in a second compound of the mixture, m+n is 14 or more.

According to a further aspect of the present invention, an electronic device is provided that includes a silicon chip, a lead frame and a passivation layer that includes a compound as described above. The compound adheres to both the silicon chip and the lead frame without the need for an additional adhesive.

Other features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The above and other features and advantages of the present invention will become more apparent after reading the following detailed description when taken in conjunction with the drawings, in which.

DETAILDED DESCRIPTION OF THE PREFERRED EMBODIMENTS

Figure 1A:
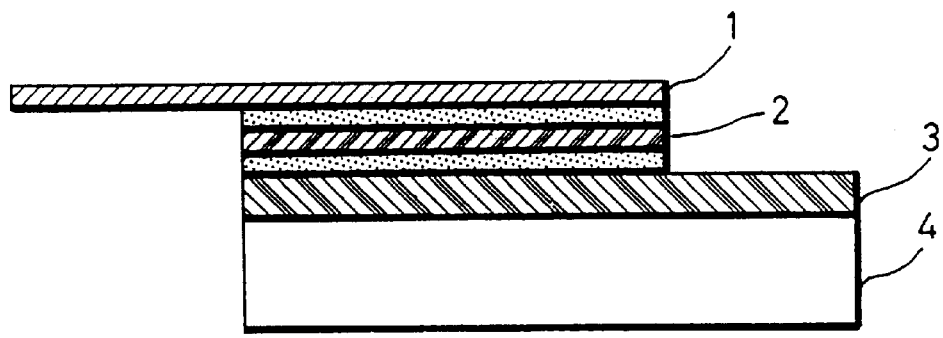
FIG. 1a is a drawing showing a cross section of a conventional semiconductor device using an adhesive tape (2) to adhere a lead frame (1), polyimide film (3), and a silicon chip (4)
Figure 1B:
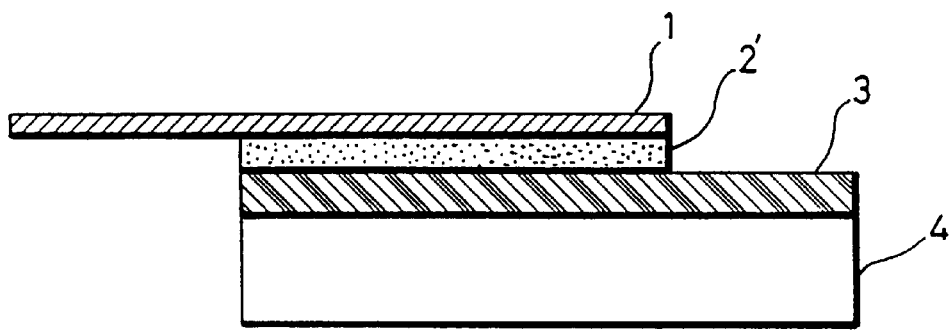
FIG. 1b is a drawing showing a cross section of a conventional semiconductor device using an adhesive (2') to adhere a lead frame (1), polyimide film (3), and a silicon chip (4)
Figure 2:
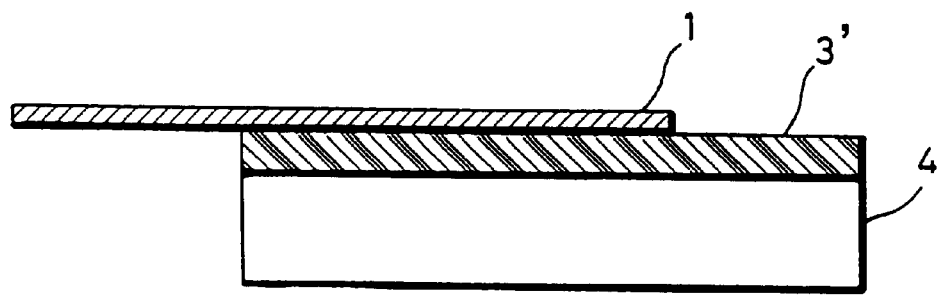
FIG. 2 is a drawing showing a cross section of a semiconductor device according to the present invention which is capable of adhering a lead frame (1) and a silicon chip (4) by the high adhesive polyimide (3') itself without an adhesive tape or an adhesive agent.

Priority Korean Patent application No. 99-45272, filed Oct. 19, 1999, is incorporated herein in its entirety by reference.

The poly(imide-siloxane) compound of the present invention is produced by reacting about 1 to about 20% by weight of a diaminosiloxane compound having the formula (1) and about 80 to about 99% by weight of a diamine compound having the formula (2) with an aromatic tetracarboxylic acid dianhydride having the formula(3) in a polar solvent. The number of moles of the compound of formula (3) is the same as the total number of moles of the two diamines (1) and (2).

The amount of the siloxane diamine compound having the formula (1) introduced to the poly(imide-siloxane) compound corresponds to about 0.01 to about 90% by weight on the basis of the total amount of the diamines.

1. Diaminosiloxane Compounds (Formula 1)

A preferable example of the diaminosiloxane compound (formula 1) according to the present invention is encompassed by the formula (4):

1,3-bis(3-aminophenoxypropyl)tetramethyl disiloxane has one unit of siloxane, a molecular weight of 433 g/mol and excellent adhesive strength with a silicon wafer in case of being introduced in a polyimide, but a low adhesive strength with a lead frame.

The compound of the formula(4) wherein "m+n" is at least one, is a diaminopolyorganosiloxane. The diaminopolyorganosiloxane is produced by cycle-open polymerizing octamethylcyclotetrasiloxane($D_4$) and octaphenylcyclotetrasiloxane ($D^{ph}_4$) as cyclic compounds with the above-synthesized 1,3-bis-(3-nitrophenoxypropyl)tetra methyldisiloxane (BNPPD) and then reducing both ends of the compound so obtained.

The compound of the formula (4) wherein each of $R_2$ to $R_5$, $R_8$ and $R_9$ is methyl group, and each of $R_6$ and $R_7$ is phenyl group, is poly(dimethylsiloxane-co-diphenylsiloxane). In this compound, the sum "m+n" is controlled by the proportion of BNPPD and ($D_4+D^{ph}_4$), and the proportion of "m" and "n" is controlled by the proportion of $D_4+D^{ph}_4$. BNPPD serves as a chain transfer agent or an end blocker to participate in a cycle-open polymerization. The more the sum "m+n" is increased, the more the adhesive strength with the lead frame increases, but the adhesive strength with the silicon wafer is reduced. The more the proportion of "n" in "m+n" is increased, the more easily the photoresist is applied.

In applying a poly(imide-siloxane) compound of the present invention to the passivation layer of a LOC semiconductor package, the sum "m+n" can be specifically defined to afford an excellent adhesive strength with both the silicon wafer as a substrate below the passivation layer and the lead frame as a substrate on the passivation layer, but the adhesive strength is not so high. Accordingly, it is preferable to introduce both a siloxane having a small value of "m+n" and a siloxane having a large value of "m+n" to the poly(imide-siloxane).

In specific embodiments, it is preferable to provide a diaminosiloxane compound having an "m+n" value of 14 or less so as to well adhere the poly(imide-siloxane) compound with the silicon wafer as a substrate below the passivation layer. Also, it is preferable to provide a diaminosiloxane compound having an "m+n" value of 14 or more so as to well adhere the poly(imide-siloxane) compound with the lead frame as a substrate on the passivation layer. It is also preferable to use a mixture of a poly(imide-siloxane) compound including a diaminosiloxane compound having an "m+n" value of 14 or less and a poly(imide-siloxane) compound including a diaminosiloxane compound having an "m+n" value of 14 more, in order to well adhere the poly(imide-siloxane) compound with both the silicon wafer as a substrate below the passivation layer and the lead frame as a substrate on the passivation layer.

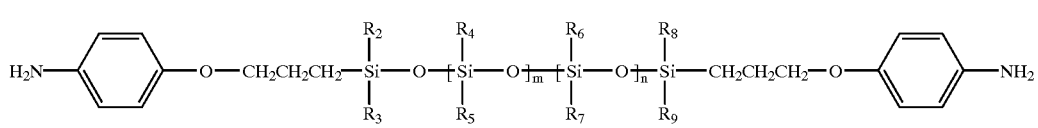

(4)

wherein each of m and n is 0, and each of $R_2$, $R_3$, $R_6$ and $R_9$ is a methyl group. The compound thus is represented as 1,3-bis(3-aminophenoxypropyl)tetramethyldisiloxane.

The 1,3-bis(3-aminophenoxypropyl)tetramethyl disiloxane is produced by reacting p-nitrophenol with potassium hydroxide to give an alkali metal salt which is coupled with 1,3-bis-(3-chloropropyl) tetramethyldisiloxane (BCPD) and then substituting both ends of BCPD with amine groups. A Specific non-limiting examples of diaminosiloxane compounds having the formula(l) are defined as follows:

$R_1$ and $R_{10}$ are independently a substituted or unsubstituted $C_1$–$C_{20}$ aliphatic group, aromatic group or ether group, said aliphatic group being selected from the group consisting of methyl, ethyl, n-propyl, iso-propyl, n-butyl, sec-butyl, t-butyl, n-pentyl, n-hexyl, n-heptyl, n-octyl, n-nonyl and n-decanyl, said aromatic group being selected from the group consisting of phenyl, hydroxyphenyl, methoxyphenyl, methylphenyl, naphthyl, chlorophenyl, bromophenyl and fluorophenyl, and said ether group being selected from the group consisting of phenoxymethyl, phenoxyethyl, phenoxypropyl, phenoxybutyl, phenoxypentyl and phenoxyhexyl;

$R_4$ and $R_5$ are independently a substituted or unsubstituted $C_1$–$C_{20}$ aliphatic group selected from the group consisting of methyl, ethyl, n-propyl, iso-propyl, n-butyl, sec-butyl, t-butyl, n-pentyl, n-hexyl, n-heptyl, n-octyl, n-nonyl and n-decanyl;

$R_6$ and $R_7$ are independently a substituted or unsubstituted $C_1$–$C_{20}$ aromatic group selected from the group consisting of phenyl, hydroxyphenyl, methoxyphenyl, methylphenyl, naphthyl, chlorophenyl, bromophenyl and fluorophenyl;

$R_2$, $R_3$, $R_8$ and $R_9$ are independently a substituted or unsubstituted $C_1$–$C_{20}$ aliphatic group or aromatic group, said aliphatic group being selected from the group consisting of methyl, ethyl, n-propyl, iso-propyl, n-butyl, sec-butyl, t-butyl, n-pentyl, n-hexyl, n-heptyl, n-octyl, n-nonyl and n-decanyl, and said aromatic group being selected from the group consisting of phenyl, hydroxyphenyl, methoxyphenyl, methylphenyl, naphthyl, chlorophenyl, bromophenyl and fluorophenyl.

Other examples of the diaminosiloxane compounds having the formula(1) are defined as follows:

$R_1$ and $R_{10}$ are independently a substituted or unsubstituted $C_1$–$C_{20}$ aliphatic group, aromatic group or ether group, said aliphatic group being selected from the group consisting of methyl, ethyl, n-propyl, iso-propyl, n-butyl, sec-butyl, t-butyl, n-pentyl, n-hexyl, n-heptyl, n-octyl, n-nonyl and n-decanyl, said aromatic group being selected from the group consisting of phenyl, hydroxyphenyl, methoxyphenyl, methylphenyl, naphthyl, chlorophenyl, bromophenyl and fluorophenyl, and said ether group being selected from the group consisting of phenoxymethyl, phenoxyethyl, phenoxypropyl, phenoxybutyl, phenoxypentyl and phenoxyhexyl;

$R_2$, R4, R6 and $R_8$ are independently a substituted or unsubstituted $C_1$–$C_{20}$ aliphatic group selected from the group consisting of methyl, ethyl, n-propyl, iso-propyl, n-butyl, sec-butyl, t-butyl, n-pentyl, n-hexyl, n-heptyl, n-octyl, n-nonyl and n-decanyl; and $R_3$, $R_5$, $R_7$ and $R_9$ are independently a substituted or unsubstituted $C_1$–$C_{20}$ aromatic group selected from the group consisting of phenyl, hydroxyphenyl, methoxyphenyl, methylphenyl, naphthyl, chlorophenyl, bromophenyl and fluorophenyl.

2. Diamine Compounds (Formula 2)

Non-limiting examples of diamine compounds of formula 2 include 4,4'-diamino diphenyl ether, 3,4'-diamino diphenyl ether, 2,2-bis[4-(4-aminophenoxy)phenyl]propane, bis[4-(4-aminophenoxy)phenyl]sulfone, 1,4'-bis(4-aminophenoxy)benzene, 2,2-bis[4-(4-aminophenoxy)phenyl] hexafluoropropane, 3,3'-dihydroxy-4,4'-diamino biphenyl, p-phenylenediamine, 2,2'-bis(4-diaminophenyl) hexafluoropropane, 1,1-bis(4-aminophenyl)-1-phenyl-2,2,2-trifluoroethane and 1,3-bis(3-aminophenoxy)benzene. These compounds can be used as a single compound or a mixture of at least two compounds.

3. Aromatic Tetracarboxylic Dianhydrides (Formula 3)

Non-limiting examples of aromatic tetracarboxylic dianhydrides of formula 3 include 1,2,4,5-tetracarboxylic benzene dianhydride, 3,4,3', 4'-benzophenone tetracarboxylic dianhydride, 3,4,3',4'-biphenyl tetracarboxylic dianhydride, terphenyl tetracarboxylic dianhydride, 2,2-bis(3,4-dicarboxylphenyl) hexafluoropropane, 1,1-bis(3,4-dicarboxyphenyl anhydride) -1-phenyl-2,2,2-trifluoroethane, 9,9-bis(trifluoromethyl)2,3,6,7-xanthene tetracarboxylic dianhydride, 3,3',4,4'-diphenylsulfonetetracarboxylic dianhydride, and 4,4'-oxydiphthalic anhydride. These compounds can be used as a single compound or a mixture of at least two compounds.

4. Polar Solvent

The polar solvent can be used together with a co-solvent. The polar solvent is preferably N-methylpyrrolidone (NMP), and the co-solvent is preferably cyclohexanone or tetrahydrofuran. Preferably, about 5 to about 90% by weight of the co-solvent is used, and about 10 to about 95% by weight of the polar solvent is used.

The low glass transition temperature (Tg) of the polyimide resin can lower the imidization temperature, thereby can reduce the consumption of energy for the process. 2,2-bis (4-(4-aminophenoxy)phenyl)propane (BAPP) is preferably combined with the diamine in order to lower the Tg of the synthesized polyimide film.

In manufacturing a semiconductor chip, the photoresist has to be applied to a polyamic acid coated on the silicon chip for processing the hole connecting gold wire. Since the introduction of a high molecular weight siloxane makes the surface of the polyamic acid coating non-polar, the photoresist is not applied to the surface. To overcome this disadvantage, a phenyl group instead of a methyl group is introduced to the siloxane. The synthesized diamino siloxane compound is a compound of formula (4) wherein each of $R_2$, $R_3$, R4, $R_5$, $R_8$ and $R_9$ is a methyl group, and each of $R_6$ and $R_7$ is a phenyl group. The proportion of "m" or "n" in "m+n" is controlled by the proportion of cyclotetradimethylsiloxane and cyclotetradiphenylsiloxane in the synthesis of the diaminosiloxane. When the proportion of diphenylsiloxane is not less than 30% by weight, the photoresist can be easily applied.

The present invention is described in more detail by the following examples, but the examples are only illustrative and, therefore, not intended to limit the scope of the present invention.

EXAMPLE 1

Homopolyimide

A mixture of 6.37 g (0.029 mol) of 1,2,4,5-benzenetetracarboxylic dianhydride (PMDA), 11.50 g (0.036 mol) of 3,3',4,4'-benzophenonetetracarboxylic dianhydride (BTDA), and 13.00 g (0.065 mol) of 4,4'-diaminodiphenyl ether (ODA) was introduced to 115.97 g of anhydrous N-methylpyrrolidone (NMP), and then stirred under an atmosphere of nitrogen and at a temperature of 10° C. for 6 hours to polymerize polyamic acid. The foregoing reactants were commercially available.

The high viscosity of the polyamic acid following polymerization was lowered to the extent of 20,000–30,000 cps so that a film might be cast by a thermal decomposition. The film was cast on a slide glass by a spin-on method, was prebaked at a temperature of 100° C. for 1 hour, was heated to 150° C. at a rate of 5° C./min and left for 1 hour, to 200° C. at a rate of 5° C./min and left for 1 hour, to 300° C. at a rate of 2° C./min, and left for 1 hour, in order, to be imidized, and then was naturally cooled to obtain the final product of film. The constituents of the film so obtained are shown in Table 1.

The thickness of the obtained film was 40 μm. The mechanical properties were determined by using an Instron in accordance with ASTM D882. The tensile strength was determined by measuring elongation at break, stress at break and Young's modulus. The thermal properties measured were the glass transition temperature and the thermal decomposition temperature. The glass transition temperature was measured at the heating rate of 5° C./min. The thermal decomposition temperature is defined as the temperature at which 10% by weight loss occurs under a heating rate of 10° C./min in an air atmosphere. The adhesive strength of the substrate with the lead frame (Alloy 42) and the silicon wafer were determined. Before Alloy 42 was used, it was dipped in dichloromethane, cleaned by an ultrasonic cleaner for 1 hour, rinsed with acetone, and dried in an oven at a temperature of 80° C. for 3 hours. The silicon wafer was used after being washed with Piranha solution ($H_2SO_4:H_2O_2=4:1$). The process for adhering polyimide with Alloy 42 was conducted by compression molding at 50 psi at a temperature of 350° C. for 70 seconds, and its adhesive strength was determined by a 90° peel test. The adhesive strength of polyimide and silicon wafer was determined by spin casting a polyamic acid on the silicon wafer, imidizing the resultant product under the same condition as the above, and subjecting it to a 90° peel test. The results of the measured properties are shown in Table 1.

TABLE 1

|  |  | Example 1 |
|---|---|---|
| Contents | Diamine (mol %) | ODA (100) |
|  | Dianhydride (mol %) | BTDA (55)/PMDA (45) |
| Tensile strength | Elongation at break (%) | 20.1 |
|  | Stress at break (Mpa) | 126.13 |
|  | Young modulus (Gpa) | 3.21 |
| Thermal properties | Glass transition temperature (° C.) | 291 |
|  | Thermal decomposition temperature (° C.) | 525.7 |
| Adhesive strength | Vs. Alloy 42 (N/m) | 96.6 |
|  | Vs. Silicon (N/m) | Near Zero |

EXAMPLE 2

Poly(imide-siloxane) modified with 1,3-bis(3-aminophenoxypropyl)tetramethyldisiloxane The same procedure as defined in Example 1 was conducted except that a mixture of 4.92 g (0.023 mol) of PMDA; 8.89 g (0.028 mol) of BTDA; 10.00 g (0.050 mol) of ODA; and 1% by weight (0.5 mol%) (Example 2A), 5% by weight (2.4 mol%) (Example 2B), and 10% by weight (4.9 mol%) (Example 2C), respectively, based on the weight of the ODA, of 1,3-bis(3-aminophenoxypropyl)tetramethyl disiloxane (molecular weight: 433g/mol; number of siloxane units: 1; m=O and n=O in formula 4) was introduced to 95.67 g of anhydrous NMP to obtain the film. The film thus obtained was tested by the same method as defined in Example 1. The mechanical and thermal properties and the adhesive strength are shown in Table 2.

TABLE 2

|  |  | Example 2A | Example 2B | Example 2C |
|---|---|---|---|---|
| Contents | Diamine (mol %) | ODA (99) | ODA (95) | ODA (99) |
|  |  | SDA (1) | SDA (5) | SDA (10) |
|  | Dianhydrides (mol %) | BTDA (55) | BTDA (55) | BTDA (55) |
|  |  | PMDA (45) | PMDA (45) | PMDA (45) |
| Tensile strength | Elongation at break (%) | 19.1 | 12.6 | 13.6 |
|  | Stress at break (Mpa) | 122.7 | 119.6 | 113.5 |
|  | Young's modulus (Gpa) | 3.3 | 3.2 | 3.0 |
| Thermal properties | Glass transition temperature (° C.) | 285.7 | 274.1 | 270.0 |
|  | Thermal decomposition temperature (° C.) | 530.0 | 531.40 | 536.0 |
| Adhesive strength | Vs. Alloy 42 (N/m) | 129.3 | 181.7 | 272.0 |
|  | Vs. Silicon (N/m) | No delamination (delamination[1]) | No delamination (940.8[1]) | No delamination[2] |

[1]after treating in the autoclave at 120° C., 1.0 kgf/m² for 6 hours.
[2]after treating in the autoclave at 120° C., 1.0 kgf/m² for 48 hours.

As is apparent in Table 2, as the amount of 1,3-bis(3-aminophenoxypropyl)tetramethyldisiloxane was increased, the adhesive strength with Alloy 42 was increased, and the adhesive strength with the silicon wafer was excellent without delamination although only 1% by weight of 1,3-bis(3-aminophenoxypropyl)tetramethyldisiloxane was introduced.

Since measurement of the adhesive strength was impossible on account of no delamination, the film was treated in an autoclave (manufactured by Tomi Seiko Co. Ltd.) at 120° C. and under a pressure of 1.0 kgf/m².

EXAMPLE 3

Poly(imide-siloxane) modified with α,ω-bis (3-aminophenoxypropyl)polydimethylsiloxane having 1300 g/mol molecular weight and 15 units of siloxane.

The same procedure as defined in Example 1 was conducted except that a mixture of 6.38 g (0.029 mol) of PMDA; 11.52 g (0.036 mol) of BTDA; 13.00 g (0.065 mol) of ODA; and 1% by weight (0.01 mol%) (Example 3A), 5% by weight (0.05 mol%) (Example 3B), 10% by weight (0.11 mol%) (Example 3C), and 20% by weight (0.25 mol%) (Example 3D), respectively, based on the weight of the ODA, of poly(imide-siloxane) modified with α,ω-bis(3-aminophenoxypropyl)polydimethylsiloxane (molecular weight: 1300 g/mol; number of siloxane units: 15; m=14 and n=0 in formula 4) was introduced to a mixed solvent including 41.37 g of anhydrous NMP and 82.75 g of cyclohexanone as a co-solvent to obtain the film. The obtained film was tested by the same method as defined in Example 1. The mechanical and thermal properties and the adhesive strength are shown in Table 3.

TABLE 3

|  |  | Example 3A | Example 3B | Example 3C | Example 3D |
|---|---|---|---|---|---|
| Contents | Diamine (mol %) | ODA (99) | ODA (95) | ODA (90) | ODA (80) |
|  |  | SDA (1) | SDA (5) | SDA (10) | SDA (20) |
|  | Dianhydrides (mol %) | BTDA (55) | BTDA (55) | BTDA (55) | BTDA (55) |
|  |  | PMDA (45) | PMDA (45) | PMDA (45) | PMDA (45) |
| Tensile strength | Elongation at break (%) | 15.6 | 17.7 | 28.3 | 23.0 |
|  | Stress at break (Mpa) | 125.3 | 121.2 | 109.1 | 99.2 |
|  | Young's modulus (Gpa) | 2.8 | 2.6 | 2.4 | 2.4 |
| Thermal properties | Glass transition temperature (° C.) | 288.61 | 287.40 | 285.40 | 281.14 |
|  | Thermal decomposition temperature (° C.) | 55.0 | 549.0 | 541.9 | 540.7 |
| Adhesive strength | Vs. Alloy 42 (N/m) | 202.3 | 225.9 | 297.6 | 334.9 |
|  | Vs. Silicon (N/m) | Near Zero | Near Zero | 951.9 | No delamination[1] |

[1]after treating in the autoclave at 120° C., 1.0 kgf/m² for 48 hours.

As is apparent from Table 3, as the amount of α,ω-bis(3-aminophenoxypropyl)polydimethylsiloxane was increased, the adhesive strength with Alloy 42 was increased, and the adhesive strength with silicon wafer was excellent even after treating it in the autoclave at a temperature of 120° C. and a pressure of 1.0 kgf/m² for 48 hours when no less than 10% by weight of α,ω-bis(3-aminophenoxypropyl)polydimethylsiloxane was used. But the adhesive strength with the silicon wafer was low when up to 5% by weight of α,ω-bis(3-aminophenoxypropyl)polydimethylsiloxane was used.

EXAMPLE 4

Poly(imide-siloxane) modified with α,ω-bis(3-aminophenoxypropyl)polydimethylsiloxane having 4800 g/mol molecular weight and 60 units of siloxane.

The same procedure as defined in Example 1 was conducted except that α,ω-bis(3-aminophenoxypropyl) polydimethylsiloxane (molecular weight: 1300 g/mol; number of siloxane units: 15; m=14 and n=0 in formula 4) was used to obtain the film. The film thus obtained was tested by the same method as defined in Example 1. The mechanical and thermal properties and the adhesive strength are shown in Table 4.

As is apparent from Table 4, as the amount of α,ω-bis(3-aminophenoxypropyl)polydimethylsiloxane was increased, the adhesive strength with Alloy 42 was increased. When 10% by weight of α,ω-bis(3-aminophenoxypropyl) polydimethylsiloxane was used, no delamination was observed. However, when 20% by weight of α,ω-bis(3-aminophenoxypropyl)polydimethylsiloxane was used, the adhesive strength with Alloy 42 was reduced. When as much as 20% by weight of α,ω-bis(3-aminophenoxypropyl) polydimethylsiloxane was used, the adhesive strength with the silicon wafer was near zero.

EXAMPLE 5

Poly(imide-siloxane) modified with α,ω-bis(3-aminophenoxypropyl)polydimethylsiloxane having 9300 g/mol molecular weight and 120 units of siloxane.

The same procedure as defined in Example 1 was conducted except that α,ω-bis(3-aminophenoxypropyl) polydimethylsiloxane (molecular weight: 9300 g/mol; number of siloxane units: 120; m=119 and n=0 in formula 4) was used to obtain the film. The film thus obtained was tested by the same method as defined in Example 1. The mechanical and thermal properties and the adhesive strength are shown in Table 5.

TABLE 4

|  |  | Example 4A | Example 4B | Example 4C | Example 4D |
|---|---|---|---|---|---|
| Contents | Diamine (mol %) | ODA (99) | ODA (95) | ODA (90) | ODA (80) |
|  |  | SDA (1) | SDA (5) | SDA (10) | SDA (20) |
|  | Dianhydrides (mol %) | BTDA (55) | BTDA (55) | BTDA (55) | BTDA (55) |
|  |  | PMDA (45) | PMDA (45) | PMDA (45) | PMDA (45) |
| Tensile strength | Elongation at break (%) | 23.4 | 22.7 | 28.8 | 38.1 |
|  | Stress at break (Mpa) | 120.5 | 112.0 | 109.1 | 93.3 |
|  | Young's modulus (Gpa) | 2.9 | 2.8 | 2.6 | 2.3 |
| Thermal properties | Glass transition temperature (° C.) | 290.6 | 288.8 | 287.9 | 285.0 |
|  | Thermal decomposition temperature (° C.) | 534.8 | 515.7 | 523.3 | 529.6 |
| Adhesive strength | Vs. Alloy 42 (N/m) | 342.5 | 458.8 | No delamination (321.2[1]) | 168.9 |
|  | Vs. Silicon (N/m) | Near Zero | Near Zero | Near Zero | Near Zero |

[1]after treating in the autoclave at 120° C., 1.0 kgf/m² for 6 hours.

TABLE 5

|  |  | Example 5A | Example 5B | Example 5C | Example 5D |
| --- | --- | --- | --- | --- | --- |
| Contents | Diamine (mol %) | ODA (99) | ODA (95) | ODA (90) | ODA (80) |
|  |  | SDA (1) | SDA (5) | SDA (10) | SDA (20) |
|  | Dianhydrides (mol %) | BTDA (55) | BTDA (55) | BTDA (55) | BTDA (55) |
|  |  | PMDA (45) | PMDA (45) | PMDA (45) | PMDA (45) |
| Tensile strength | Elongation at break (%) | 23.7 | 21.1 | 26.7 | 38.7 |
|  | Stress at break (Mpa) | 117.8 | 111.9 | 110 | 98.5 |
|  | Young's modulus (Gpa) | 2.8 | 2.6 | 2.6 | 2.5 |
| Thermal properties | Glass transition temperature (° C.) | 290.7 | 288.9 | 288.92 | 287.8 |
|  | Thermal decomposition temperature (° C.) | 545.7 | 550.1 | 542.0 | 543.0 |
| Adhesive strength | Vs. Alloy 42 (N/m) | 315.7 | 218.9 | 115.5 | 70.9 |
|  | Vs. Silicon (N/m) | Near Zero | Near Zero | Near Zero | Near Zero |

As is apparent from Table 5, as the amount of α,ω-bis(3-aminophenoxypropyl)polydimethylsiloxane was increased, the adhesive strength with Alloy 42 was reduced. The adhesive strength with silicon wafer was not substantially observed (near zero) when as much as 20% by weight of α,ω-bis(3-aminophenoxypropyl) polydimethylsiloxane was used.

EXAMPLE 6

Poly(imide-siloxane) including 2,2-bis(4-(4-aminophenoxy)phenyl)propane (BAPP)

As discussed previously, a low glass transition temperature (Tg) of the polyimide resin lowers the imidization temperature, and thus reduces the energy consumption in the process. 2,2-bis(4-(4-aminophenoxy)phenyl)propane (BAPP) was included with the diamine in order to lower the Tg of the synthesized polyimide film.

The same procedure as defined in Example 1 was conducted except that the mixture of 4.9 g (0.022 mol) of PMDA; 8.94 g (0.027 mol) of BTDA; 9.9 g(0.049 mol) of ODA; 10% by weight (0.02 mol%) of α,ω-bis(3-aminophenoxypropyl) polydimethylsiloxane (molecular weight: 4800 g/mol; n=60 in formula 4); and 1% by weight (0.1 g) (Example 6A), 5% by weight (0.5 g) (Example 6B), 10% by weight (1.0 g) (Example 6C), and 20% by weight (2.0g) (Example 6D), respectively based on the weight of the ODA, of BAPP in a mixed solvent including 49.7 g of anhydrous NMP and 49.7 g of cyclohexanone as a co-solvent to obtain the film. The film thus obtained was tested by the same method as defined in Example 1. The mechanical and thermal properties and the adhesive strength are shown in Table 6.

Measurement of Adhesive Strength of PI with Lead Frame Depending on Processing Condition:

In order to know the optimal processing conditions for increasing the adhesive strength, the adhesive strengths of the homopolyimide produced in Example 1 and the polyimide produced in Examples 3C and 3D with the lead frame (Alloy 42) were determined. Results are shown in Table 7.

TABLE 7

| Adhesive Condition |  | Example 1 | Example 3C | Example 3D |
| --- | --- | --- | --- | --- |
| Tempetature (° C.) | 300 | 47.5 | 0 | 53.8 |
| (79 sec/50 psi) | 325 | 95.6 | 217.5 | 282.8 |
|  | 350 | 113.1 | 308.2 | 330.2 |
|  | 375 | 31.2 | 147.5 | 265.1 |
| Time (sec) | 10 | 104.9 | 433.5 | 474.4 |
| (350° C./50 psi) | 20 | 119.9 | 495.1 | 516.8 |
|  | 30 | 111.7 | 453.9 | 493.3 |
|  | 50 | 108.3 | 397.7 | 393.6 |
|  | 70 | 96.6 | 306.5 | 334.9 |
| Pressure (psi) | 10 | 95.1 | 310.8 | 334.5 |
| (350° C./70 sec) | 50 | 98.6 | 305.2 | 334.9 |
|  | 100 | 112.1 | 306.5 | 390.0 |
|  | 150 | 105.3 | 306.8 | 327.5 |

As is apparent in Table 7, as the processing temperature was elevated, the adhesive strength was increased. But the adhesive strength was rather decreased at a temperature of 375° C. or more. The adhesive strength was highest at the processing time of 20 seconds, but was reduced as the processing time was increased. Also, no change in adhesive strength depending on an increase in the processing pressure was observed.

TABLE 6

|  |  | Example 4A | Example 4B | Example 4C | Example 4D |
| --- | --- | --- | --- | --- | --- |
| Contents | Diamine (mol %) | ODA (89.1) | ODA (85.5) | ODA (81) | ODA (72) |
|  |  | SDA (10) | SDA (10) | SDA (10) | SDA (20) |
|  |  | BAPP (0.9) | BAPP (4.5) | BAPP (9) | BAPP (18) |
|  | Dianhydrides (mol %) | BTDA (55) | BTDA (55) | BTDA (55) | BTDA (55) |
|  |  | PMDA (45) | PMDA (45) | PMDA (45) | PMDA (45) |
| Tensile strength | Elongation at break (%) | 20.1 | 21.2 | 20.7 | 18.7 |
|  | Stress at break (Mpa) | 115.0 | 114.8 | 114.8 | 111.4 |
|  | Young's modulus (Gpa) | 3.0 | 3.0 | 3.0 | 2.8 |
| Thermal properties | Glass transition temperature (° C.) | 284.3 | 278.1 | 273.62 | 268.4 |
|  | Thermal decomposition temperature (° C.) | 527.8 | 515.6 | 518.3 | 517.4 |

Test for Adhesion Durability of PI with Lead Frame

In order to determine the adhesive durability of the polyimide with the lead frame (Alloy 42), the so-called "85/85 test" (temperature of 85° C., relative humidity of 85%) was conducted with the homopolyimide obtained in Example 1, the poly(imide-siloxane) obtained in Example 4B and PIX 3400 (manufactured by Hitachi Co., Ltd.), and the results of the test were shown in Table 8. The polyimides were adhered to Alloy 42 by compression mould at a temperature of 350° C. and a pressure 50 psi for 70 seconds, were placed in a wet room, were taken out in each time and were subjected to the 90° determine the adhesive strength.

As is apparent in Table 8, when the storage time was 192 hours, the homopolyimide obtained in Example 1 had little adhesion and PI 3400 had a low adhesion durability of 55.9 N/m, while the poly(imide-siloxane) obtained in Example 4B showed a high adhesive durability of 322.0 N/m.

TABLE 8

| Time (hrs) | Example 1 | Example 4B | PIX 3400 |
| --- | --- | --- | --- |
| 0 | 97.0 | 457.2 | 212.3 |
| 2 | 89.9 | 466.8 | 211.6 |
| 24 | 48.2 | 437.0 | 201 |
| 48 | 42.3 | 429.3 | 130.4 |
| 78 | 17.4 | 414.4 | 135.7 |

TABLE 8-continued

| Time (hrs) | Example 1 | Example 4B | PIX 3400 |
| --- | --- | --- | --- |
| 114 | 19.1 | 317.5 | 104.2 |
| 192 | 0 | 322.0 | 55.9 |
| 259 | 0 | 264.9 | 49.8 |

EXAMPLE 7

Photoresist Wetability and Adhesive Strength I for Surface of Polyamic Acid Containing Poly (dimethylsiloxane-co-diphenylsiloxane)

As mentioned previously, in manufacturing the semiconductor chip, the photoresist has to be applied to a polyamic acid coated on the silicon chip for processing the hole connecting gold wire. Since the introduction of a high molecular weight siloxane makes the surface of the polyamic acid coating non-polar, the photoresist is not applied to the surface. To overcome this disadvantage, a phenyl group instead of a methyl group is introduced to the siloxane. The synthesized diamine siloxane compound is the compound of formula (4) wherein each of $R_2$, $R_3$, $R_4$, $R_5$, $R_6$ and $R_9$ is a methyl group, and each of $R_6$ and $R_7$ is a phenyl group. The proportion of "m" or "n" in "m+n" is controlled by the proportion of cyclotetradimethylsiloxane and cyclotetradiphenylsiloxane in the synthesis of diaminosiloxane.

The same procedure as defined in Example 4 was conducted except that /)-bis(3-aminophenoxypropyl) poly (dimethylsiloxane-co-diphenylsiloxane) having 4800 g/mol molecular weight and proportions of dimethylsiloxane to diphenylsiloxane (m:n) of 9:1 (Example 7A), 8:2 (Example 7B), and 7:3 (Example 7C), respectively, was used in the amount of 10% by weight based on the weight of the diamine (ODA). Then, the test for coating properties of the photoresist "AZ1511" (manufactured by Hoechst Co., Ltd.) was performed. As a result, it was confirmed that the coating property of the photoresist was excellent when the proportion of diphenylsiloxane was not less than 30% by weight. The mechanical, thermal and coating properties are shown in Table 9.

TABLE 9

| | | Example 7A | Example 7B | Example 7C |
| --- | --- | --- | --- | --- |
| Contents | Diamine (mol %) | ODA (90) SDA (10) m:n = 9:1 | ODA (90) SDA (10) m:n = 8:2 | ODA (90) SDA (10) m:n = 7:3 |
| | Dianhydrides (mol %) | BTDA (55):PMDA (45) | | |
| Tensile strength | Elongation at break (%) | 22.9 | 21.4 | 21.4 |
| | Stress at break (Mpa) | 111.5 | 112.3 | 112.3 |
| | Young's modulus (Gpa) | 2.8 | 2.8 | 2.8 |
| Thermal properties | Glass transition temperature (° C.) | 286.4 | 285.9 | 284.32 |
| Adhesive strength | Vs. Alloy 42 (N/m) | 390.0 | 297.6 | 198.4 |
| Coating Property | Photoresist coating | Poor | Poor | Good |

EXAMPLE 8

Photoresist Wetability and Adhesive Strength II for Surface of Polyamic Acid Containing Poly (dimethylsiloxane-co-diphenylsiloxane)

The same procedure as defined in Example 3 was conducted except that α,ω-bis(3-aminophenoxypropyl) poly (dimethylsiloxane-co-diphenylsiloxane) having 1500 g/mol molecular weight and proportions of dimethylsiloxane to diphenylsiloxane (m:n) of 7:3 was used in the amount of 1% by weight (Example 8A), 5% by weight (Example 8B), 10% by weight (Example 8C), and 20% by weight (Example 8D), respectively based on the weight of the diamine(ODA). Then, the test for coating properties of the photoresist "AZ1511" (manufactured by Hoechst Co., Ltd.) was performed. As a result, it was confirmed that the coating property of the photoresist was excellent regardless of the amount of siloxane diamine. The mechanical, thermal and coating properties are shown in Table 10.

TABLE 10

|  |  | Example 8A | Example 8B | Example 8C | Example 8D |
|---|---|---|---|---|---|
| Contents | Diamine (mol %) | ODA (99) SDA (1) | ODA (95) SDA (5) | ODA (90) SDA (10) | ODA (80) SDA (20) |
|  | Dianhydrides (mol %) | | BTDA (55):PMDA(45) | | |
| Tensile strength | Elongation at break (%) | 22.2 | 21.7 | 19.0 | 17.1 |
|  | Stress at break (Mpa) | 122.8 | 118.3 | 112.3 | 89.4 |
|  | Young's modulus (Gpa) | 3.0 | 3.0 | 2.7 | 2.4 |
| Thermal properties | Glass transition temperature (° C.) | 524.8 | 531.4 | 529.2 | 538.4 |
| Adhesive strength | Vs. Alloy 42 (N/m) | 150.1 | 159.5 | 198.4 | 227.8 |
| Coating Property | Photoresist coating | Good | Good | Good | Good |

EXAMPLE 9

Determination for Adhesive Strength of Poly(imide-siloxane) Containing Two Kinds of Siloxane Having Different Molecular Weight from Each Other As is apparent in Examples 1 to 5, when the molecular weight of siloxane is high, the adhesive strength with lead frame (Alloy 42) is good, but the adhesive strength with silicon wafer is poor, and vice versa. In this connection, it is considered that the polyimide having both high molecular weight siloxane and low molecular weight siloxane will exhibit an excellent adhesive strength with both lead frame and silicon wafer. Accordingly, the test for adhesive strength was performed with the blend of poly(imide-siloxane) of Examples 7C and 8D, and PI M7P3-5000-20, and poly(imide-siloxane) of Example 2C, which have the most adhesive strength with both lead frame (Alloy 42) and silicon wafer. The poly(imide-siloxane) of Example 9A is mixed with the poly(imide-siloxane) of Example 2C and 8D, the poly(imide-siloxane) of Example 9B is mixed with the poly(imide-siloxane) of Examples 2C and 7C, and the poly(imide-siloxane) of Example 9C is mixed with the poly(imide-siloxane) of Example 2C and PI M7P3-5000-20 in a mixed weight ratio of 1:1, respectively. The conditions for determining the adhesive strength with lead frame were a temperature of 350° C., time of 20 seconds and pressure of 70psi. The results of the test for the adhesive strength with a lead frame and a silicon wafer in Examples 9A, 9B and 9C are shown in Table 11.

TABLE 11

|  | Example 9A | Example 9B | Example 9C |
|---|---|---|---|
| Mixture (ratio 50:50) | PI 433-10 PI 5000-20 | PI 433-10 PI 5000-10 | PI 433-10 PI 5000-20 |
| Adhesive strength with Alloy 42 (N/m) | No delamination (228.5[1]) | No delamination (193.7[1]) | No delamination (278.0[1]) |
| Adhesive strength with silicon (N/m) | No delamination[2] | No delamination[2] | No delamination[2] |
| Photoresist coating | Excellent | Excellent | Excellent |

[1]treating in the autoclave at 120° C., 1.0 kgf/m² for 6 hours.
[2]treating in the autoclave at 120° C., 1.0 kgf/m² for 48 hours.

Test for Water-Absorption of Poly(imide-siloxane)

The water-absorption of the above obtained poly(imide-siloxane) film was determined by using a Cahn Balance at a temperature of 30° C. and a relative humidity of 100%. As a result, the homopolyimide containing no siloxane produced in Example 1 exhibited as high as 3.1% water-absorption, while the poly(imide-siloxane) produced in Example 5C exhibited as low as 0.5% water absorption, and the poly(imide-siloxane) produced in Example 9A exhibited as low as 0.7% water absorption, respectively.

Film Transparency of Poly(imide-siloxane)

The transparency of the obtained poly(imide-siloxane) film depends on the domain size of the phase-separated siloxane. Observing the cross section of the film with the TEM, the domain size of the phase-separated siloxane produced in Example 4C was about 300 nm and opaque, but the domain size of the phase-separated siloxane produced in Example 7C was 30 nm and transparent. Therefore, it was confirmed that the film made of siloxane containing a phenyl moiety was transparent.

EFFECTS OF THE INVENTION

The present invention provides a poly(imide-siloxane) compound, which can be used as a passivation layer without silane coupling agents or adhesive tapes. The compound of the present invention has high adhesive strength with both silicon chip and lead frame, has low water-absorption and good photoresist wetability by changing the silicon chemical structure and controlling the domain size of the separated siloxane, and thus employ lithography process, and further can reduce the cost for manufacturing a semiconductor by simplifying the process and reducing the cost of materials.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A composition comprising first compound (a) and second compound (b) that is different from compound (a), each of said compounds (a) and (b) produced by reacting in a polar solvent a diaminosiloxane compound of the formula (1),

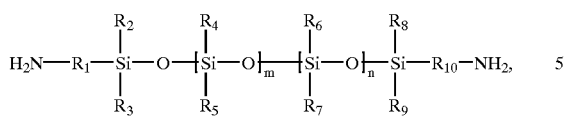
(1)

wherein $R_1$ and $R_{10}$ are independently a substituted or unsubstituted $C_1$–$C_{20}$ aliphatic group, aromatic group, or ether group;

$R_2$, $R_3$, $R_8$ and $R_9$ are independently a substituted or unsubstituted $C_1$–$C_{20}$ aliphatic group, aromatic group, or hydroxy group;

$R_4$ and $R_5$ are independently a substituted or unsubstituted $C_1$–$C_{20}$ aliphatic group;

$R_6$ and $R_7$ are independently a substituted or unsubstituted $C_1$–$C_{20}$ aromatic group; and m+n is an integer from 0 to 200, and a diamine compound of the formula number (2),

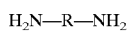
 (2), wherein R is at least one selected from the following groups:

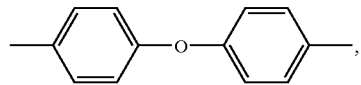,

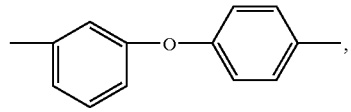,

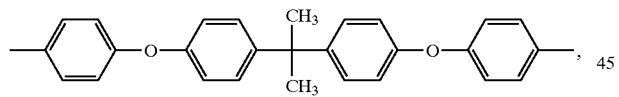,

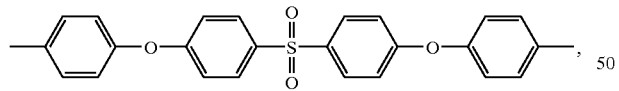,

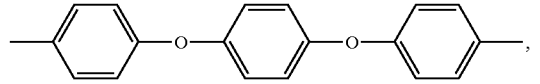,

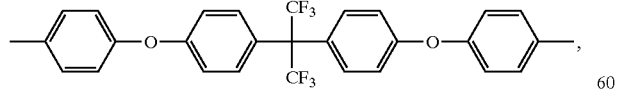,

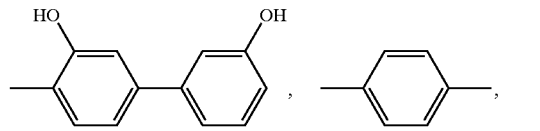,

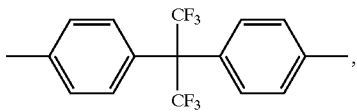

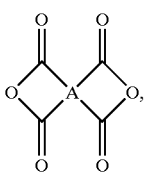

with an aromatic tetracarboxylic dianhydride of the formula (3) in a molar quantity equal to that of the total moles of the compounds (1) and (2):

(3)

wherein A is at least one selected from the following groups:

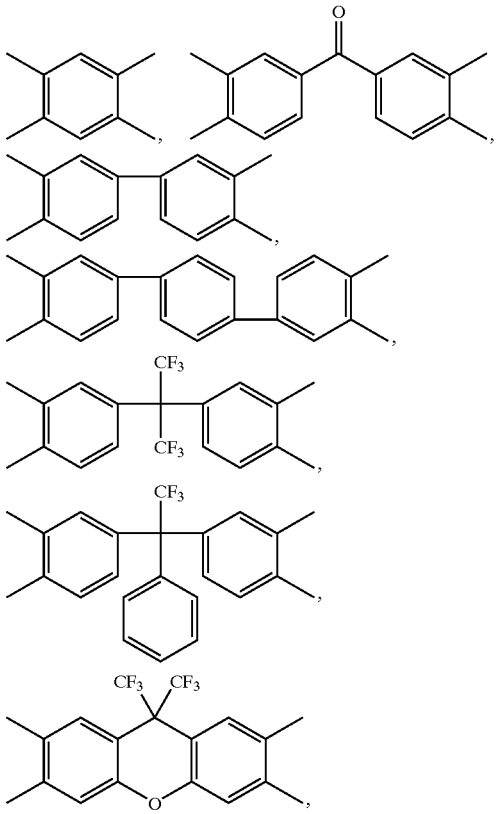

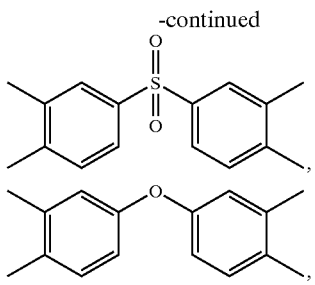

wherein in the first compound (a), m+n is 14 or less, and in the second compound (b), m+n is 14 or more.

2. The composition according to claim 1, wherein:

$R_1$ and $R_{10}$ are independently a substituted or unsubstituted $C_1$–$C_{20}$ aliphatic group, aromatic group or ether group, the aliphatic group being selected from the group consisting of methyl, ethyl, n-propyl, iso-propyl, n-butyl, sec-butyl, t-butyl, n-pentyl, n-hexyl, n-heptyl, n-octyl, n-nonyl and n-decanyl, the aromatic group being selected from the group consisting of phenyl, hydroxyphenyl, methoxyphenyl, methylphenyl, naphthyl, chlorophenyl bromophenyl and fluorophenyl, and the ether group being selected from the group consisting of phenoxymethyl, phenoxyethyl, phenoxypropyl, phenoxybutyl, phenoxypentyl and phenoxyhexyl;

$R_4$ and $R_5$ are independently a substituted or unsubstituted $C_1$–$C_{20}$ aliphatic group selected from the group consisting of methyl, ethyl, n-propyl, iso-propyl, n-butyl, sec- butyl, t-butyl, n-pentyl, n-hexyl, n-heptyl, n-octyl, n-nonyl and n-decanyl;

$R_6$ and $R_7$ are independently a substituted or unsubstituted $C_1$–$C_{20}$ aromatic group selected from the group consisting of phenyl, hydroxyphenyl, methoxyphenyl, methylphenyl, naphthyl, chlorophenyl, bromophenyl and fluorophenyl; and $R_2$, $R_3$, $R_8$ and $R_1$ are independently a substituted or unsubstituted $C_1$–$C_{20}$ aliphatic group, aromatic group, or hydroxy group, the aliphatic group being selected from the group consisting of methyl, ethyl, n-propyl, iso-propyl, n-butyl, sec-butyl, t-butyl, n-pentyl, n-hexyl, n-heptyl, n-octyl, n-nonyl and n-decanyl, and the aromatic group being selected from the group consisting of phenyl, hydroxyphenyl, methoxyphenyl, methylphenyl, naphthyl, chlorophenyl, bromophenyl and fluorophenyl.

3. The composition as claimed in claim 1, wherein the diaminosiloxane compound has the following formula:

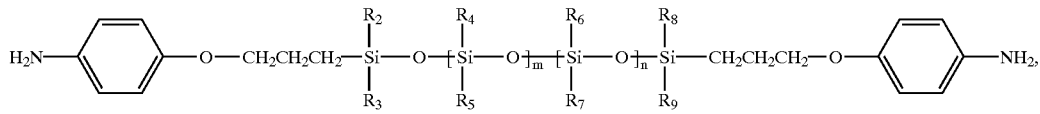

wherein, $R_2$, $R_3$, $R_8$ and $R_9$ are independently a substituted or unsubstituted $C_1$–$C_{20}$ aliphatic group, aromatic group, or hydroxy group;

$R_4$ and $R_5$ are independently a substituted or unsubstituted $C_1$–$C_{20}$ aliphatic group;

$R_6$ an $R_7$ are independently a substituted or unsubstituted $C_1$–$C_{20}$ aromatic group; and m+n is an integer from 0 to 200.

4. The composition as claimed in claim 1, wherein at least one of compound (a) and compound (b) is produced by reacting a mixture of 1 to 20% by weight of a diaminosiloxane compound of formula (1) and 80 to 99% by weight of a diamine compound of formula (2) with a dianhydride of formula (3).

5. The composition as claimed in claim 1, wherein in at least one of compound (a) and compound (b) the amount of the diaminosiloxane compound of formula (1) is 0.01 to 90% by weight based on the total amount of the diamine compound of formula (2).

6. The composition as claimed in claim 1, wherein in at least one of compound (a) and compound (b) the diamine compound is at least one selected from the group consisting of 4,4'-diamino diphenyl ether, 3,4'-diamino diphenyl ether, 2,2-bis[4-(4-aminophenoxy)phenyl]propane, bis[4-(4-aminophenoxy)phenyl]sulfone, 1,4'-bis(4-aminophenoxy)benzene, 2,2-bis[4-(4-aminophenoxy)phenyl] hexafluoropropane, 3,3'-dihydroxy-4,4'-diamino biphenyl, p-phenylene diamine, 2,2'-bis(4-diaminophenyl) hexafluoropropane, 1,1-bis(4-aminophenyl)-1-phenyl-2,2,2-trifluoroethane, and 1,3-bis(3-aminophenoxy)benzene.

7. The composition as claimed in claim 1, wherein in at least one of compound (a) and compound (b) the aromatic tetracarboxylic dianhydride is at least one selected from the group consisting of 1,2,4,5-tetracarboxylic benzene dianhydride, 3,4,3',4'-benzophenone tetracarboxylic dianhydride, 3,4,3',4'-biphenyl tetracarboxylic dianhydride, terphenyl tetracarboxylic dianhydride, 2,2-bis(3,4-dicarboxylphenyl) hexafluoropropane, 1,1-bis(3,4-dicarboxyphenyl anhydride)-1-phenyl-2,2,2-trifluoroethane, 9,9-bis(trifluoromethyl)2,3,6,7-xanthene tetracarboxylic dianhydride, 3,3',4,4'-diphenylsulfonetetracarboxylic dianhydride and 4,4'-oxydiphthalic anhydride.

8. The composition as claimed in claim 1, wherein the polar solvent is N-methylpyrollidone.

9. The composition as claimed in claim 8, wherein the polar solvent further comprises 5 to 90% by weight of at least one co-solvent.

10. The composition as claimed in claim 9, wherein the co-solvent is cyclohexanone or tetrahydrofuran.

11. The composition as claimed in claim 1, wherein the diamine compound of formula (2) is 2,2-bis(4-(4-aminophenoxy)phenyl)propane(BAPP).

12. The composition as claimed in claim 1, wherein n and m of the diaminosiloxane compound of formula (1) satisfies the following relation:

$$0.3 \leq n/(m+n) \leq 1.$$

13. An electronic device comprising a passivation layer, the passivation layer comprising a composition as claimed in claim 1.

* * * * *